United States Patent [19]
Boddy et al.

[11] Patent Number: 5,467,230
[45] Date of Patent: Nov. 14, 1995

[54] DUAL PIVOTED MEMBER MOUNT FOR MIRROR

[75] Inventors: Ian Boddy, Ada; Donald S. Rawlings, Livonia, both of Mich.

[73] Assignee: Lowell Engineering Corp., Alto, Mich.

[21] Appl. No.: 106,883

[22] Filed: Aug. 16, 1993

[51] Int. Cl.$^6$ ..................................................... B60R 1/06
[52] U.S. Cl. .................. 359/874; 359/876; 359/877; 248/479; 248/480; 248/487
[58] Field of Search ........................... 359/872, 873, 359/874, 876, 877; 248/479, 480, 487

[56] References Cited

U.S. PATENT DOCUMENTS

| | | | |
|---|---|---|---|
| 4,116,538 | 9/1978 | Oskam | 359/877 |
| 4,286,841 | 9/1981 | Deshaw | 359/877 |
| 4,362,362 | 12/1982 | Usami et al. | 359/874 |
| 4,572,626 | 2/1986 | Suzuki | 359/874 |
| 4,678,295 | 7/1987 | Fisher | 359/874 |
| 4,915,493 | 4/1990 | Fisher et al. | 359/874 |

*Primary Examiner*—Paul M. Dzierzynski
*Assistant Examiner*—John Juba, Jr.
*Attorney, Agent, or Firm*—Cushman, Darby & Cushman

[57] ABSTRACT

A rearview mirror assembly comprising a mirror unit, a mirror unit support, and a central connection between the mirror unit and support mounting the mirror unit for pivotal movement about first and second generally intersecting perpendicular axes. A first arm is mounted on the support for pivotal movement about the first axis and connected with the mirror unit for limited pivotal movement about the second axis at a position spaced from the first axis. A second arm is mounted on the support for pivotal movement about the second axis and connected with the mirror unit for compound movement for compound movement which includes limited lateral movement with respect to the first axis and pivotal movement about an axis which is either coincident with or slightly angularly related with the first axis depending upon the position of relative lateral movement. A manually controlled mechanism is carried in part by the support for effecting a desired movement of the mirror unit together with a corresponding movement of either one or both of the first and second arms with respect to the support in response to a remote manual movement by a user.

36 Claims, 5 Drawing Sheets

DUAL PIVOTED MEMBER MOUNT FOR MIRROR

This invention relates to rearview mirror assemblies and more particularly to rearview mirror assemblies of the type adapted to be mounted on an exterior side of a motor vehicle so as to be viewed by a driver within the vehicle.

Examples of rearview mirror assemblies contemplated by the present invention are disclosed in U.S. Pat. Nos. 4,678,295 and 4,915,493. Characteristically, such rearview mirror assemblies include a mirror unit, a mirror unit support and connections between the mirror unit and support which serve to mount the mirror unit on the support for movement into a desired position in response to a remote manual movement as by the vehicle driver. Typically, the connections include a central ball and socket snap-in connection between the mirror unit and support which serves to mount the mirror unit on the support for universal pivotal movement about a pivot point.

The support in the form of a casing assembly disclosed in the '493 patent is capable of alternative connections. One alternative is to extend three 120° displaced Bowdine wire assemblies around the central connection, the ends of the Bowdine wires themselves being fixedly connected with the mirror unit and the adjacent ends of the casings for the Bowdine wires being fixed to the support. The Bowdine wire assemblies are then extended to a remote location and connected with a manual control lever so that a remote manual movement by the driver of the control lever serves to effect a desired movement of the mirror unit.

The other more important alternative disclosed in the '493 patent also involves a remote control lever which can be moved by a remote manual movement of the driver. In this case, movement of the control lever serves to electrically energize and deenergize reversible electric motors within the support casing assembly connected by 90° displaced yieldable motion transmitting assemblies to the mirror unit. Typically, each motion transmitting assembly is an expandable and contractible telescoping assembly connected at one end, as by a ball and socket connection, to the support and at an opposite end, as by a ball and socket connection, to the mirror unit. The ball and socket connections were necessary to accommodate the changing angle of each assembly as it is expanded and contracted. Moreover, because the necessary ball and socket connections do not add stability to the central universal pivotal connection, it was further necessary to provide additional stabilizing connections between the mirror unit and support. The somewhat complex nature of the expandable and contractible assemblies and the need to provide added stabilizing connections for the central connection materially increased the cost of such mirror assemblies. There is always a need in the motor vehicle parts business to provide a motor vehicle part, such as rearview mirror assembly, which is more cost effective.

It is an object of the present invention to provide a mirror assembly having improved cost effective connections between the mirror unit and support which eliminate the need for additional stabilizing connections and provide simplified moving connections which eliminate the use of the more complex expandable and contractible assemblies mentioned above. In accordance with the principles of the present invention, this objective is achieved by providing a rearview mirror assembly which comprises a mirror unit, a mirror unit support, a central connection between the mirror unit and the support mounting the mirror unit on the support for pivotal movement about first and second generally intersecting perpendicular axes. A first arm is mounted on the support for pivotal movement between limits with respect to the support about the first axis and connected with the mirror unit to enable limited pivotal movement of said mirror unit with respect to the first arm about the second axis at a position spaced from the first axis. A second arm is mounted on the support for pivotal movement between limits with respect to the support about the second axis and connected with the mirror unit for compound movement with respect thereto at a position spaced from the second axis which compound movement includes limited lateral movement with respect to the first axis and pivotal movement about an axis which is either coincident with or slightly angularly related with the first axis depending upon the position of relative lateral movement. A manually controlled mechanism is carried in part by the support for effecting a desired movement of the mirror unit together with a corresponding movement of either one or both of the first and second arms with respect to the support in response to a remote manual movement by a user.

In the broader aspects of the present invention, it becomes possible to not only achieve the advantages noted above but to eliminate the central connection as well. In accordance with the principles of the present invention, this objective is achieved by providing a rearview mirror assembly comprising a mirror unit having a mirror side and an opposite side, and a mirror unit support disposed on the opposite side of the mirror unit. A first member is mounted on the support for pivotal movement between limits with respect to the support about a first axis. The first member includes a first pair of spaced arms extending from the support toward the mirror unit and forming first spaced connections with the opposite side of the mirror unit at positions spaced in opposite direction from the first axis. The first member is constructed and arranged to enable limited pivotal movement of the mirror unit with respect to the first member about a second axis disposed in generally intersecting perpendicular relation with the first axis. A second member is mounted on the support for pivotal movement between limits with respect to the support about the second axis. The second member includes a second pair of spaced arms extending from the support toward the mirror unit and forming second spaced connections with the opposite side of the mirror unit at positions spaced in opposite directions from the second axis. The second member is constructed and arranged to enable limited pivotal movement of the mirror unit with respect to the second member about the first axis. A manually controlled mirror unit moving mechanism is carried in part by the support for effecting a desired movement of the mirror unit together with a corresponding movement of either one or both of the first and second members with respect to the support in response to a remote manual movement by a user.

Preferably, in order to provide the greatest stability possible between the mirror unit and the support while still achieving a measure of the advantages noted above, it is within the contemplation of the present invention to provide a rearview mirror assembly which comprises a mirror unit having a mirror side and an opposite side and a mirror unit support disposed on the opposite side of the mirror unit. A central connection is provided between the opposite side of the mirror unit on the support for pivotal movement about first and second generally intersecting perpendicular axes. A first member is mounted on the support for pivotal movement between limits with respect to the support about the first axis. The first member includes a first pair of spaced arms extending from the support toward the mirror unit and connected with the opposite side of the mirror unit at positions spaced in opposite directions from the first axis for limited pivotal movement with respect to the mirror unit about the second axis. A second member is mounted on the support for pivotal movement between limits with respect to the support about the second axis. The second member includes a second pair of arms extending from the support toward the mirror unit and connected with the opposite side of the mirror unit for compound movement with respect thereto at positions spaced in opposite directions from the second axis which compound movement includes limited lateral movement with respect to the first axis and pivotal movement about an axis which is either coincident with or slightly angularly related with the first axis depending upon the position of relative lateral movement. A manually controlled mechanism is carried in part by the support for effecting a desired movement of the mirror unit together with a corresponding movement of either one or both of the first and second members in response to a remote manual movement by a user.

The '295 and '493 patents discussed above also incorporate into the disclosed mirror assemblies a memory system by which the driver can determine a particular setting of a mirror unit which is appropriate and, if the mirror unit is moved from that particular position, the memory system is such that the particular setting can be easily recalled from computer memory and used to effect movement of the mirror unit into that particular setting. The memory system disclosed in both patents involves the provision of a pair of additional sensing members having particular connections between the support casing assembly and the mirror unit which serve to achieve as much accuracy as possible based upon the mounting provided. The present invention, as previously described, lends itself to the provision of a memory system of the type disclosed in the '295 and '493 patents which can be operated more accurately directly from the first and second arms provided for mirror unit mounting and movement purposes without the necessity of providing additional sensing members. Consequently, more accuracy and additional cost effectiveness can be achieved where the mirror assembly is to be provided with memory capability.

Another object of the present invention is the provision of a rearview mirror assembly of the type described which is simple in construction, effective in operation, and economical to manufacture.

These and other objects of the present invention will become more apparent during the course of the following detailed description and appended claims.

The invention may best be understood with reference to the accompanying drawings wherein an illustrative embodiment is shown.

Referring now more particularly to the drawings, there is shown in FIGS. 1–5 thereof a rearview mirror assembly, generally indicated at 10, which embodies the principles of the present invention. The rearview mirror assembly 10 includes a mirror unit, generally indicated at 12, and a mirror unit support, generally indicated at 14. The support 14 is in the form of a casing assembly which, in turn, is mounted on a shell-like support member 16 which is suitably fixed to the side of a motor vehicle (not shown) as, for example, to the forward central portion of a front door thereof. The support member 16 can be of any conventional construction and need not be a fixed support but could be a spring-biased foldaway support assembly of any well-known construction.

The present invention is more particularly concerned with the manner in which the mirror unit 12 is mounted on and moved with respect to the mirror unit support 14 rather than with the configuration and construction of the support member 16 and its connection with the mirror unit support 14, all of which may be conventional. The mirror unit 12 has a mirror side which is defined by a mirror 18 and an opposite side which is defined by a mirror holder 20 within which the mirror 18 is mounted in fixed relation. In the preferred embodiment of the rearview mirror assembly 10, shown in FIGS. 1–6, the casing assembly support 14 is preferably formed of first and second cooperating housing parts 22 and 24. The second housing part 24 is disposed in facing relation with the opposite side of the mirror unit 12 and the first housing part 22 cooperates with the second housing part 24 to define a housing space therein.

A central connection formed by two connecting structures 26 and 28 is disposed between the opposite side of the mirror unit 12 and the support 14. As shown, the connecting structure 26 forms an integral part of the second housing part 24 whereas the connecting structure 28 forms an integral part of the mirror holder 20. It will be understood, however, that the two connecting structures 26 and 28 can be reversed if desired. The connecting structures 26 and 28 are of the snap-in type and are adapted to establish a pivotal interconnection between the support 14 and the mirror unit 12 which provides for pivotal movement about first and second generally intersecting perpendicular axes. The connecting structures 26 and 28 may be of any configuration suitable to establish the aforesaid pivotal movements of the mirror unit 12 with respect to the support 14. However, as shown, they are preferably constructed in the manner disclosed in the '493 patent, the disclosure of which is hereby incorporated into the present specification.

As shown, the integral connecting structure 26 on the support 14 includes a projecting base portion 30 having an enlarged portion 32 on a projecting end of the base portion 30. The enlarged portion 32 has a first convex connecting surface 34 which is disposed within a first spherical plane having a first pair of truncations one of which is defined by an intersection with the base portion 30. In the embodiment shown, the surface 34 is a dual truncated spherical surface extending throughout the first dual truncated spherical plane. It will be understood that portions of the surface 34 within the plane may be omitted.

The enlarged portion 32 also has a first concave connecting surface 36 facing away from the base portion 30 which is disposed within a first spherical segmental plane having (1) a center coincident with the center of the first truncated spherical plane and (2) a radius smaller than the radius of the first truncated spherical plane. As before, surface 36 is a segmental spherical surface extending throughout the plane. Portions may be omitted however. An annular wall surface 38 which preferably is conical extends from the spherical segmental surface 36 to the truncated spherical surface 34 in outwardly diverging relation.

The integral connecting structure 28 on the mirror holder 20 comprises a projecting annular wall 40 having a second concave connecting surface 42 disposed within a second spherical plane having (1) a radius generally equal to the radius of the first spherical plane and (2) a second pair of parallel truncations. Surface 42 as shown is a dual truncated spherical surface extending throughout the second dual truncated spherical plane although portions thereof may be omitted.

The integral connecting structure 28 also includes a projecting central portion 44 within the annular wall 40 which is in the form of a cone having its apex formed with a second convex connecting surface 46 facing in the direction of the projection of the annular wall disposed within a second spherical segmental plane having (1) a center coincident with the center of the second truncated spherical plane and (2) a radius equal to the radius of the first spherical plane segmental plane. Surface 46, as shown, is a spherical segmental surface extending throughout the second spherical segmental plane although portions thereof may be omitted.

It will be noted that both the first and second housing part 22 and 24 of the casing assembly support 14 are molded of plastic material and that similarly the mirror holder 20 is molded of plastic material as well. The nature of the plastic material utilized, as, for example, Delrin® or the like, and the construction of the annular wall 40 is such that the annular wall is operable in response to the movement of the enlarged portion 32 therein to resiliently yield and resiliently return to bring the first convex connecting surface 34 of the enlarged portion 32 into engagement with the second concave connecting surface 42 of the annular wall 40 so as to retain the first and second integral connecting structures 26 and 28 against movement in a direction away from one another and the first concave connecting surface 36 of the enlarged portion 32 into engagement with the second concave connecting surface 46 of the projecting central portion 44 so as to limit the movements of the first and second connecting structures 26 and 28 in a direction toward one another. The engagement of the connecting surfaces permits relative sliding movement therebetween so as to retain the members in cooperating relation in a multiplicity of different positions of pivotal movement of the mirror holding member with respect to the support member along the aforesaid two intersecting perpendicular axes. It will be noted that such pivotal movements are limited by the extent of the truncated surfaces 34 and 42 and that the differences in the angles of divergence of the conical surface of the portion 46 with respect to the conical surface 38 of the portion 32 accommodate such movements.

In addition to the central connection 26–28, the mirror unit 12 is mounted on the mirror unit support 14 by first and second mounting members 48 and 50 mounted on the support for pivotal movement between limits with respect to the support 14 about the first and second generally intersecting perpendicular axes respectively provided by the central connection 26–28. The first mounting member 48 includes a first pair of spaced arms 52 and 54 which extend from the support 14 toward the mirror unit 12 and are connected on the opposite side of the mirror unit at positions spaced in opposite directions from the first axis for limited pivotal movement with respect to the mirror unit 10 about the second axis. The second member 50 includes a second pair of arms 56 and 58 extending from the support 14 toward the mirror unit 12 and connected with the opposite side of the mirror unit 12 for compound movement with respect thereto at positions spaced in opposite directions from the second axis. The compound movement includes limited lateral movement with respect to the first axis and pivotal movement about an axis which is either coincident with or slightly angularly related with the first axis depending upon the position of relative lateral movement.

Figure 1:
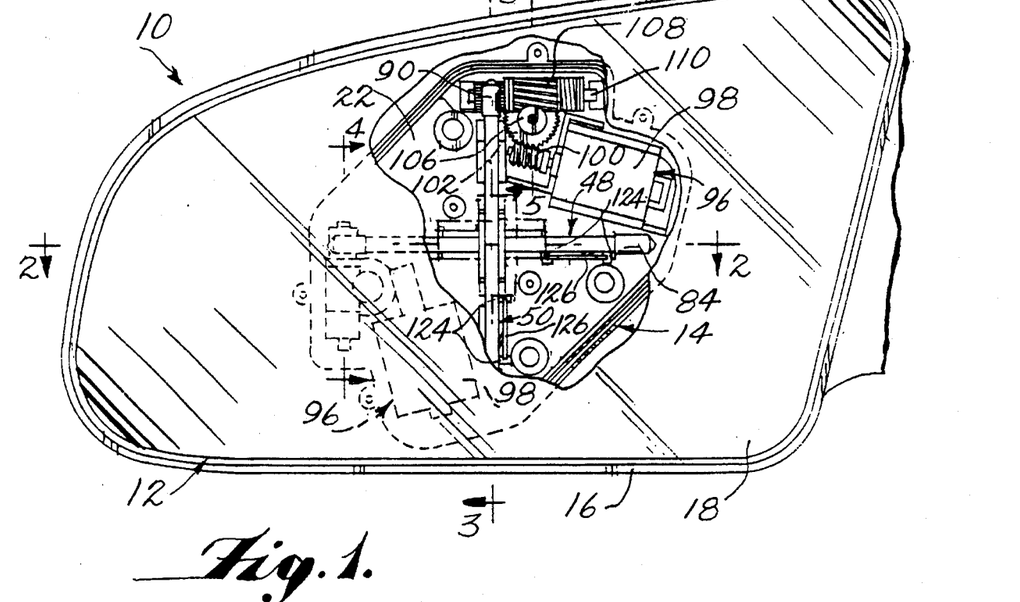
FIG. 1 is an elevational view looking forward at the rear of a mirror assembly embodying the principles of the present invention, with parts broken away for purposes of clear illustration.
Figure 2:
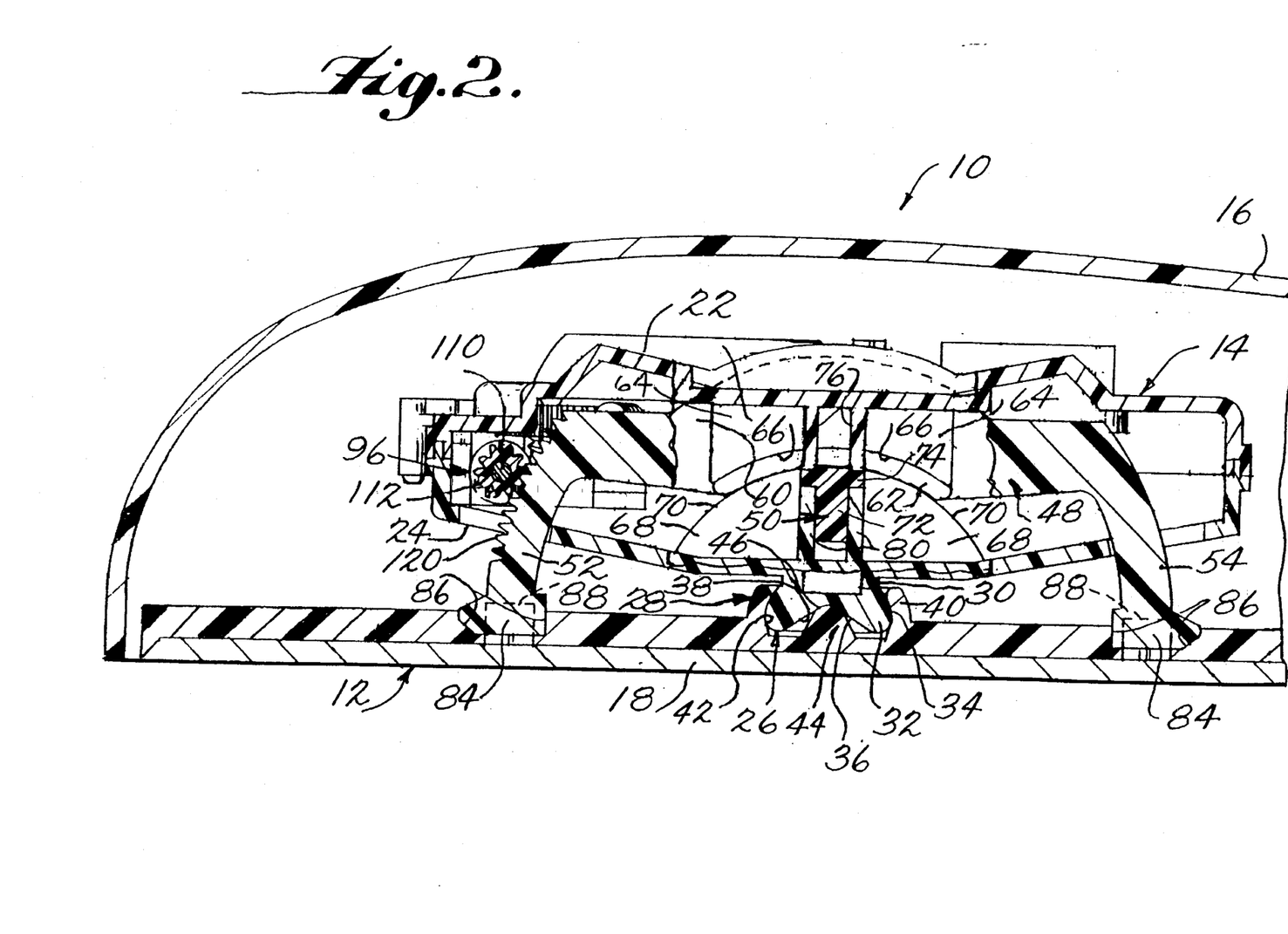
FIG. 2 is an enlarged sectional view taken along the line 2—2 of FIG. 1.

Referring now more particularly to FIGS. 1 and 2, the first mounting member 48 includes a central portion 60 between the first pair of arms 52 and 54 which has a pair of arcuate flanges 62 extending from opposite sides thereof. The first pair of flanges 62 are arcuate about the first axis. The first housing part 22 has a first arcuately spaced pair of first parallel rail sections 64 fixed therein within the aforesaid interior space having first arcuate concave surfaces 66 on the free edges thereof slidably engaging convex surfaces of the first pair of arcuate flanges 62. The second housing part 24 has a first arcuately spaced pair of second parallel rail sections 68 fixed therein within the interior housing space having first radially spaced arcuate convex surfaces 70 on the free edges thereof slidably engaging concave surfaces of the first arcuate flanges 62 respectively. It can be seen that, when the first and second housing parts 22 and 24 are moved into engagement so that the aforesaid arcuate surfaces 66 and 70 of the parallel rail sections 64 and 68 engage the arcuate flanges 62 and the two housing parts are secured in cooperating relation as by threaded fasteners or the like, the engagement of the arcuate surfaces 66 and 70 on opposite sides of the arcuate flanges 62 will serve to mount the first member 48 within the interior housing space provided by the first and second housing parts for pivotal movement between the limits with respect to the support 14 about the first axis.

Figure 3:
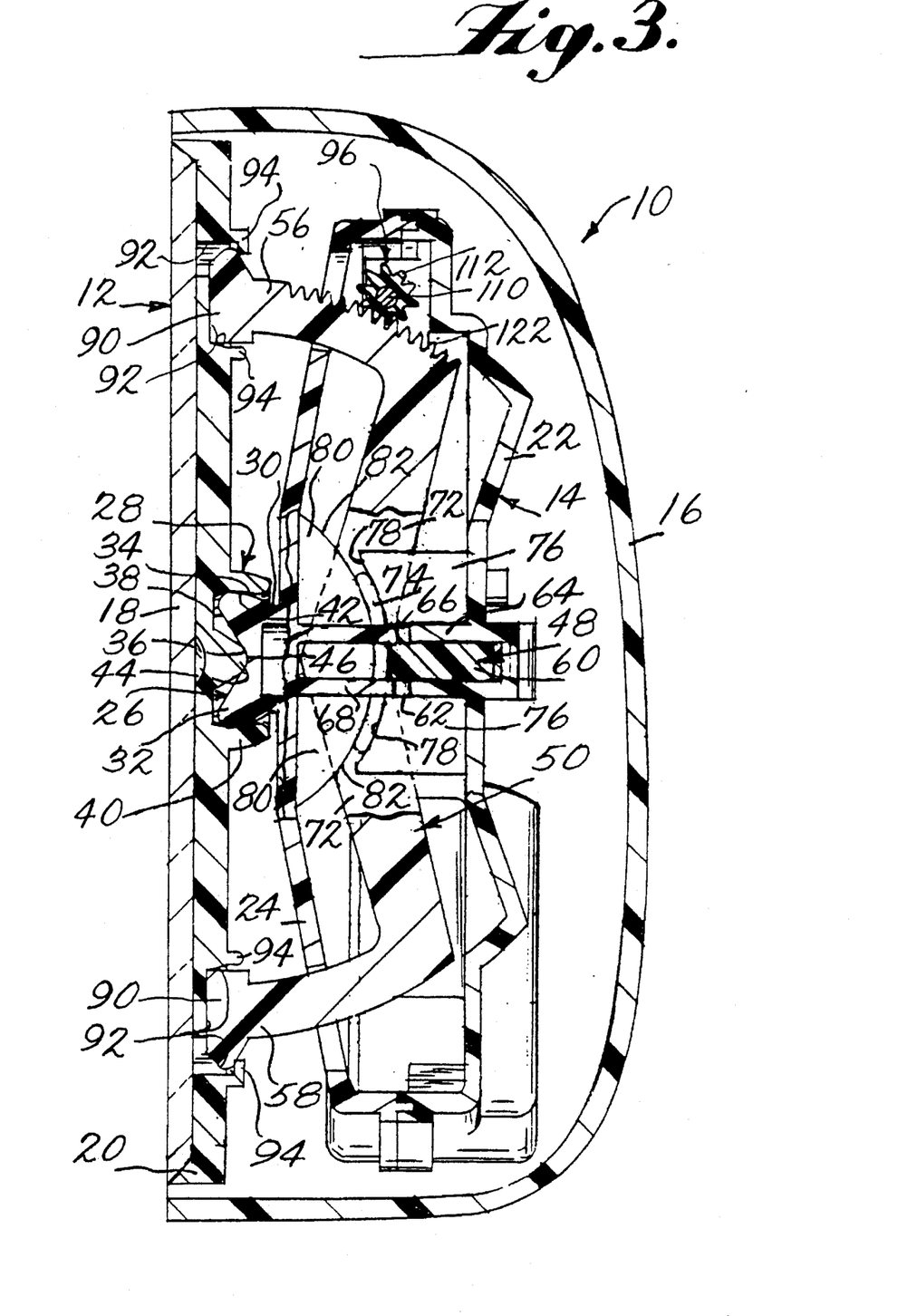
FIG. 3 is a enlarged sectional view taken along the line 3—3 of FIG. 1.

Referring now more particularly to FIGS. 1 and 3, it can be seen that the second mounting member 50 includes a central portion 72 between the second pair of arms 58 and 60 thereof which has a pair of arcuate flanges 74 extending outwardly therefrom. The flanges 74 are arcuate about the second axis. As before, the first housing part 22 includes a second arcuately spaced pair of first parallel rail sections 76 fixed therein within the interior space which have second arcuate concave surfaces 78 on the free edges thereof, spaced radially from the first concave surfaces 66, which slidably engage the convex surfaces of the second pair of arcuate flanges 74. Also, as before, the second housing part 24 includes a second arcuately spaced pair of second parallel rail sections 80 therein within the interior housing space and having convex surfaces 82 on the free edges thereof, spaced radially from the first convex surfaces 70, which slidably engage the concave surfaces of the second arcuate flanges 74. In this way, the second mounting member 50 is pivotally mounted within the housing space between the two housing parts 22 and 24 when they are moved together and fixed in cooperating relation with one another. The mounting enables the second member 50 to pivot within limits with respect to the support 14 about the second axis. It will be noted that the second housing part 24 includes openings through which the first and second pairs of arms are enabled to extend from the support 14 toward the mirror unit 12. If desired, a flexible tubular bellows-like sealing element (not shown) may be mounted in surrounding relation with the outwardly extending end of each arm. One end of the bellows is connected to the outer end of the arm and the other end is connected with the exterior of the second housing part 24 in surrounding relation to the associated opening.

The connection between the ends of the first pair of arms 52 and 54 and the mirror unit 12 is also preferably a snap-action type connection and, as shown, there is formed on the end of each of the first pair of arms 52 and 54 a first cylindrical connecting element 84 having an axis which is aligned with the second axis. The mirror holder 20 is formed with surfaces 86 which rotatably receive an outer peripheral portion of each first cylindrical connecting element 84 and a pair of cantilevered arcuate walls 88 for rotatably engaging on opposite sides of an inner peripheral portion of each first cylindrical connecting element 84. The flexure of the cantilever mount of the walls 88 allows the elements 84 to be snapped into engagement with the surfaces 86 and the engaging surfaces of the walls 88. In this way, the first cylindrical connecting elements 84 are captured so that they can only be moved pivotally in opposite directions between limits relative to the mirror holder 20 about the second axis.

The connection between the second pair of arms 56 and 58 and the mirror unit 12 includes a second cylindrical connecting element 90 on the outer end of each of the second pair of arms 56 and 58. The mirror holder 20 is formed with surfaces 92 which slidably receives an outer peripheral portion of each second cylindrical connecting element 90 for limited lateral movement and a pair of flexible cantilevered walls 94, one of which is L-shaped, for engaging opposite ends of an inner peripheral portion of each second cylindrical connecting element 90. As shown, the outer end of each second cylindrical connecting element 90 may be formed into a conical shape. A similar conical end shape can be provided on each first cylindrical connecting element 84. Here, again, the cantilever mount of the L-shaped walls 94 allow the elements 90 to be mapped into engagement with the surfaces 92 and the engaging surfaces of the walls 94. In this way, the second cylindrical connecting elements 90 are captured so that they are capable of a compound movement with respect to the mirror holder 20. The compound movement includes lateral sliding movement along the engaging surfaces 92 with respect to the mirror holder 20 and a limited pivoted movement about an axis which is either coincident with or slightly angularly related with the first axis.

It will be understood that the mirror unit 12 mounted in the manner thus far described could be moved by a three Bowdine wire assembly connected between the support 14 and the mirror unit 12 in the manner indicated in the '295 patent. Alternatively, a two Bowdine wire assembly could be used in which case the end of the two Bowdine wires would be connected to the first and second members 48 and 50 respectively, and the ends of the Bowdine wire casings would be connected to the first housing part 22 so that movement of the Bowdine wires would effect pivotal movement of the mounting members 48 and 50.

In accordance with the principles of the present invention, it is preferable, however, to provide a power-operated assembly, generally indicated at 96, for effecting the pivotal movement of each of the first and second mounting members 48 and 50 respectively. Each power-operated assembly 96 includes a reversible electric motor 98 carried within the housing space between the housing parts 22 and 24 in an appropriate position with respect to the associated mounting member. Each electric motor 98 is connected as by a yieldable gear train with the associated mounting member.

Figure 4:
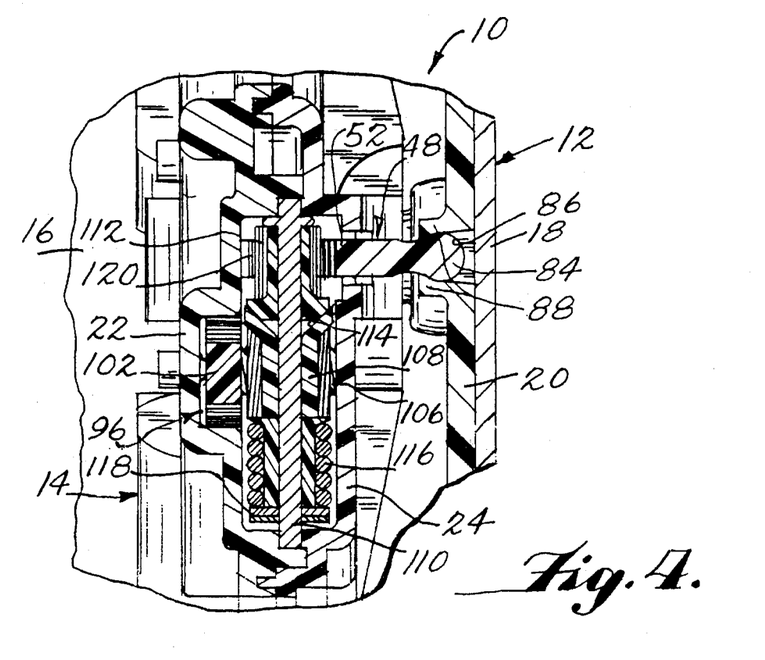
FIG. 4 is an enlarged sectional view taken along the line 4—4 of FIG. 1.
Figure 5:
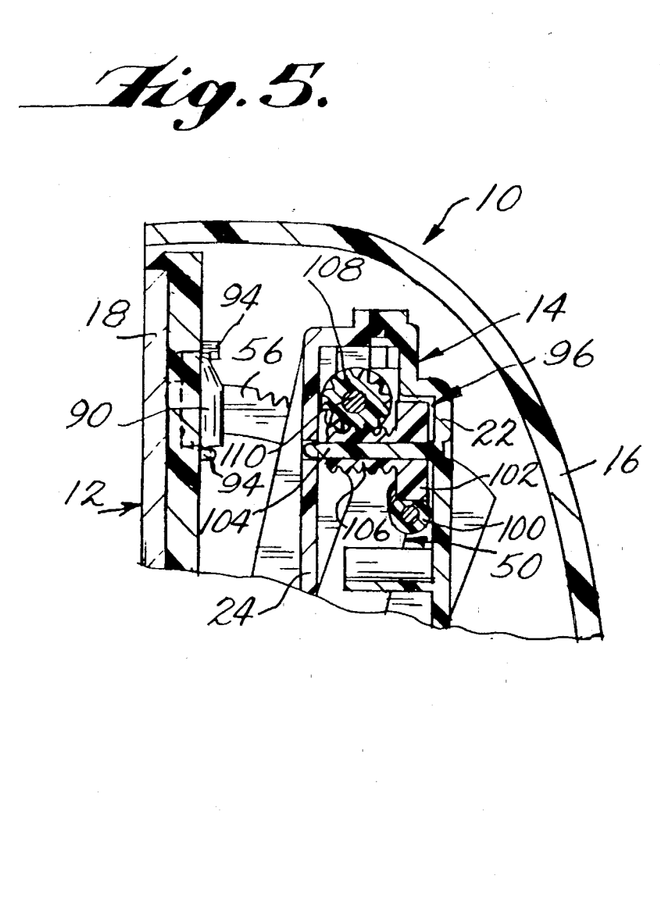
FIG. 5 is an enlarged sectional view taken along the line 5—5 of FIG. 1.

Referring now more particularly to FIGS. 1, 4, and 5, each yieldable gear train includes a worm 100 fixed to the output shaft of the electric motor 98. Worm 100 is disposed in meshing engagement with a worm pinion 102 suitably journalled on a shaft 104 extending between the housing parts 22 and 24 as best shown in FIG. 5. Fixed to rotate with the worm pinion 102 is a spiral gear 106 which is disposed in meshing relation with a toothed wheel 108. The toothed wheel 108 is journalled on a shaft 110 suitably mounted between the housing parts 22 and 24 as best shown in FIG. 4. The toothed wheel 108 is disposed in side-by-side relation with a second gear wheel 112 which is rotatably mounted on the shaft 110 and for movement toward and away from the toothed wheel 108. The two wheels 108 and 112 include frusto-conical clutch interengaging surfaces 114 which are resiliently biased into yieldable driving relation to one another by a coil spring 116. Coil spring 116 surrounds the shaft 110 and has its ends connected between washers 118 fixed axially with respect to the shaft 110 and the adjacent toothed wheel 106. The gear wheel 112 of the power-operated assembly 96 associated with the first mounting member 48 is disposed in engagement with a series of teeth 120 arcuate about the first axis formed along the outer edge of the arm 52. Likewise, the gear wheel 112 of the power-operated assembly 96 associated with the second mounting member 50 meshes with a series of teeth 112 arcuate about the second axis formed along the outer edge of the arm 56 of the second mounting member 50.

It will be understood that the electric motors 98 are under the control of a control lever (not shown) which is mounted in a position of access to the driver so that a remote manual movement of the control lever will serve to energize one or both of the electric motors in the desired direction to movement the mirror unit 12 with respect to the mirror unit support 14 into a desired operating position to be viewed by the driver through the associated door window. The control lever is such that the direction of movement of the control lever determines the direction of movement of the motor or motors which are energized. When each electric motor 98 is energized, the associated worm 100 is turned which, in turn, will rotate the associated worm pinion 102 about the axis of its shaft 100. The associated spiral gear 106 turns with the worm pinion 102 in the same direction and the meshing engagement of the spiral gear with the associated toothed wheel 106 will cause a corresponding rotational movement of the toothed wheel 106 about the associated shaft 110. The associated spring 116 serves to resiliently bias the clutch surface 114 of the toothed wheel 106 with the clutch surface 114 of the associated gear wheel 112 so that the latter is rotated with the former about the axis of the shaft 110. The rotation of the gear wheel 112 in meshing relation with the gear teeth 120 or 122 on the associated arm 52 or 56 of the associated mounting member 48 or 50 will effect a corresponding pivotal movement of the associated mounting member about its pivotal axis with respect to the support 14. In the case where the second mounting member 50 is moved, the connections of the pair of arms 52 and 54 of the first member 48 with the rear holder 20 serve to restrict the pivotal movement of the mirror unit 12 about the second axis. It is noted that the spacing of the connecting elements 84 in opposite directions from the first axis is sufficient to prevent movement about the first axis and a third axis intersecting the first and second axes. In the case where the first mounting member 48 is moved, the connections of the pair of arms 56 and 58 of the second member 50 restrict the movement of the mirror unit about the first axis but the compound movement allowed by the connecting elements 90 permit the first axis to shift laterally at each connection to accommodate diagonal tilting when present. The central connection assures that the first axis will extend through the pivot point provided between the connecting structures 26 and 28. The spacing of the connecting elements 90 in opposite directions from the second axis is sufficient to present movement about the aforesaid third axis.

Figure 6:
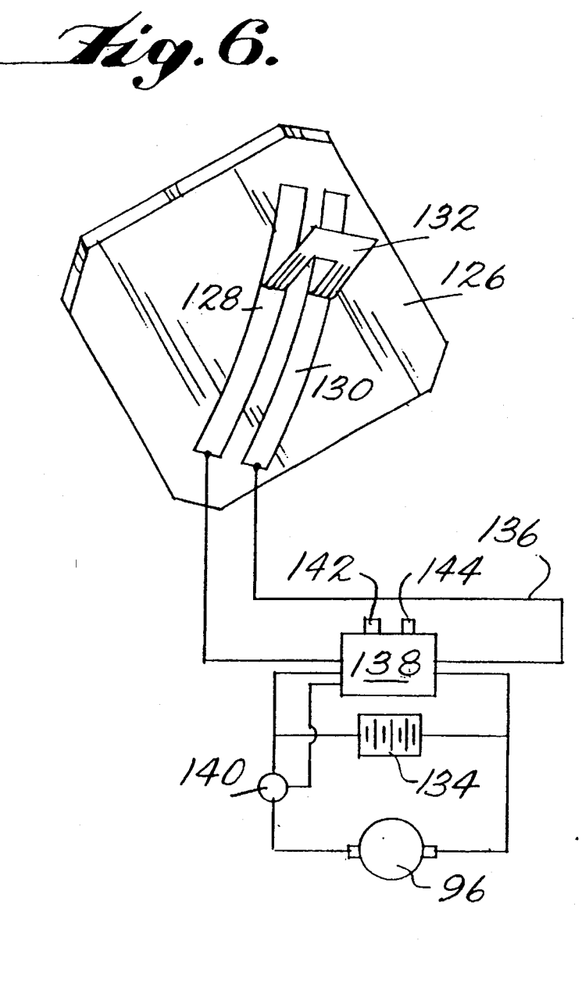
FIG. 6 is a schematic view of a potentiometer circuit of the memory system.

As previously indicated, the pivotal mounting of the mounting members 48 and 50 with respect to the support 14 is such as to render the present subject matter easily susceptible to having a memory function applied thereto. Moreover, the memory function can be provided by a position-sensing arrangement operatively connected between the support 14 and each of the mounting members 48 and 50 to determine the pivotal position of each of the mounting members. While any suitable means may be provided, a preferred sensing means is in the form of a potentiometer similar to the potentiometer disclosed in the '295 patent, the disclosure of which is hereby incorporated by reference into the present specification. As first shown in FIG. 1, the housing part 22 is provided with first and second pairs of guides 124 which receive first and second circuit boards 126. As best shown in FIG. 6, mounted on each circuit board 126 is a pair of arcuate electric resistance elements 128 and 130. A brush 132 is operatively associated with each pair of arcuate resistance elements 128 and 130. Each brush 132 has two slides connected by a cross piece. The cross piece of one brush 1332 is mounted in the arm 54 of the first mounting member 48 so that the spaced slides extend therefrom into sliding engagement with the arcuate resistance elements 128–130 of circuit board 126 mounted in the associated pair of guides 124. A second brush 132 is similarly mounted in arm 58 of the second mounting member 50 to extend therefrom in sliding engagement with the arcuate resistance elements 182–130 of the associated circuit board 126.

As best shown in FIG. 6, the conductive resistance element 128 of each circuit board 126 is connected to a voltage source 134 such as the vehicle battery. As each mounting member is pivoted, the brush 130 carried thereby moves along both arcuate conducting surfaces of the associated elements 128–130. This movement creates a variable electrical resistance on element 128 which generates an electrical signal proportionally responsive to the position of the mirror unit 12. This signal is carried by the brush 132 to where it is received by the conductive element 130. A wire 136 attached to conductive element 130 carries a signal to a microprocessor 138.

In operation, the vehicle operator adjusts the mirror unit 12 to a desired position by using the manual switches 140 to actuate the associated motor 98. The adjustment of the mirror unit 12 generates an electrical signal across the linear arcuate potentiometer which is then received by the microprocessor 138. Once the desired adjustment is obtained, the operator pushes a set button 142, whereupon the microprocessor 138 records the signal received.

If the position of the mirror unit 12 is thereafter changed, all the vehicle operator has to do to return the mirror unit to the original position selected is to press the actuator button 144. The microprocessor 138 then starts the associated motor 96 of the associated power-operated assembly 96 which pivots the associated mounting member 48 or 50 to reposition the mirror unit 12. The motor or motors 96 continue to run as the linear potentiometers sense the signal changes across elements 128. The signal changes are continually received by the microprocessor 138 through element 130 and wire 136. The microprocessor 138 compares the received signals with the recorded signal. When the linear potentiometers reach the position having the identical signal as the recorded signal, the microprocessor 138 immediately stops the associated motor 96. The mirror unit is now readjusted to the desired pre-set position.

It will be understood, in accordance with the principles of the present invention, that, while the potentiometer is mounted with respect to the arm of each mounting member which does not have the series of gear teeth formed thereon that it would be nevertheless within the contemplation of the present invention to provide the potentiometer on the same arm. Moreover, it is possible in accordance with the principles of the present invention to eliminate one of the arms of each of the mounting members so that there is only a single connection of a single arm to the mirror holder for each member. The spacing of the single arms is sufficient to restrict the pivotal movements of the mirror unit in the manner previously indicated. The provision of a pair of arms is preferred because of the greater stability provided thereby.

Figure 7:
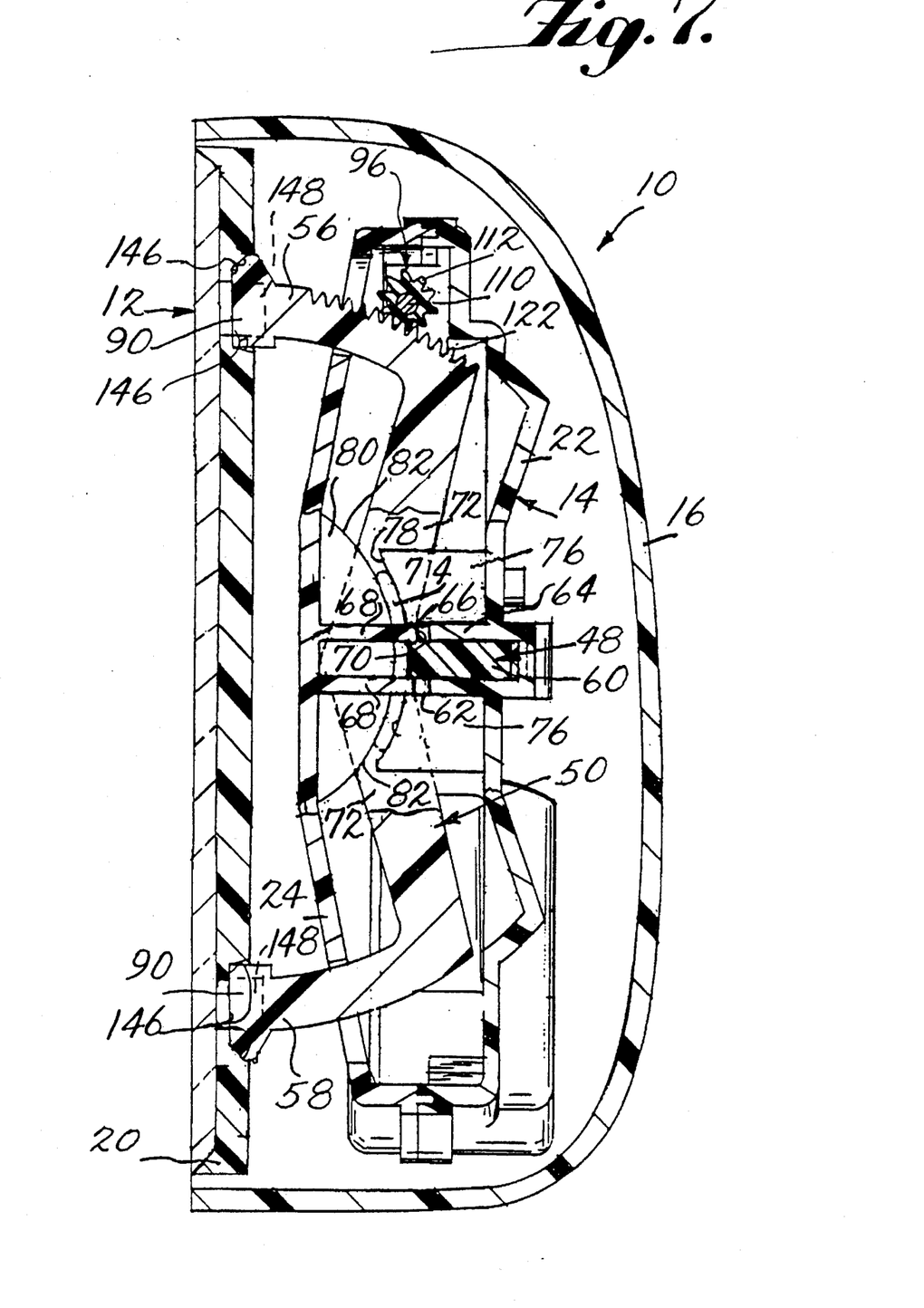
FIG. 7 is a view similar to FIG. 3 showing the modifications of a modified form of mirror assembly embodying the principles of the present invention.

Referring now more particularly to FIG. 7, there is shown therein modifications to the rearview mirror assembly 10 which are clearly contemplated by the present invention. Specifically, in this embodiment, wherein the same reference numerals are utilized to designate the same parts as previously recited, the elements of the connecting structures 26 and 28 forming the center connection are eliminated. This can be done by eliminating either one or both of the connecting structures, as shown. The connections of the first pair of arms 52 and 54 of the first mounting member 48 to the mirror unit 12 are the same, but the connections of the second pair of arms 56 and 58 of the second mounting member 50 are modified from the connections, such as shown in FIG. 3, to connections similar to that made for the arms 52 and 54. Thus, the mirror holder 20 includes surfaces 146 similar to the surfaces 86 and flexible walls 148 similar to the flexible walls 88. In this way, the second mounting member 50 is connected with the mirror unit 12 for pivotal connection only about the first axis. With the connections as shown in FIG. 7, the adjusting movement of the mirror unit 12 will take place in the same way as previously described except that the tilting movement in the diagonal direction is accommodated by the omission of the center connection so that, when a diagonal tilting movement is involved, as, for example, a tilting movement in both directions, the lack of a center connection will accommodate the diagonal tilting movement so that the mirror unit 12 does not at all times pivot about a single point as is the case with the first embodiment which includes a center connection with the diagonal tilting being accommodated by the compound movement afforded by the connecting elements 90.

The provision of cylindrical connecting elements 84 and 90 is preferred because of ease of molding. However, it will be understood that spherical connecting elements could be utilized in conjunction with corresponding shaped surfaces and walls.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A rearview mirror assembly comprising a mirror unit having a mirror side and an opposite side, a mirror unit support disposed in facing relation to the opposite side of said mirror unit, a central connection between the opposite side of said mirror unit and said support mounting said mirror unit on said support for pivotal movement about first and second generally intersecting perpendicular axes, a first arm mounted on said support for pivotal movement between limits with respect to said support about said first axis and connected with the opposite side of said mirror unit to enable limited pivotal movement of said mirror unit with respect to said first arm about said second axis at a position spaced from said first axis, a second arm mounted on said support for pivotal movement between limits with respect to said support about said second axis and connected with the opposite side of said mirror unit to enable compound movement of said mirror unit with respect to said second arm at a position spaced from said second axis which compound movement includes limited lateral movement with respect to said first axis and pivotal movement about an axis which is either coincident with or slightly angularly related with said first axis depending upon the position of relative lateral movement, and a manually controlled mechanism carried in part by said support for effecting a desired movement of said mirror unit together with a corresponding movement of either one or both of said first and second arms with respect to said support in response to a remote manual movement by a user.

2. A rearview mirror as defined in claim 1 wherein said support includes first and second separate housing parts disposed in fixed cooperating relation with one another so that said second housing part faces the opposite side of said mirror unit and defines with said first housing part an interior housing space.

3. A rearview mirror as defined in claim 2 wherein said mirror unit includes a mirror and a mirror holder within which said mirror is mounted, said mirror holder defining the opposite side of said mirror unit, said central connection including a first connecting structure fixed to the exterior of said mirror holder and extending toward said second housing part and a second connecting structure fixed to the exterior of said second housing part and extending toward said mirror holder, said connecting structures being operable to be moved into cooperating relation with one another by a snap action.

4. A rearview mirror as defined in claim 3 wherein one of said connecting structures comprises a projecting base portion having an enlarged portion on a projecting end of said base portion, said enlarged portion having a first convex connecting surface disposed within a first imaginary spherical surface having a first pair of parallel truncations one of which is defined by an intersection with said base portion, said enlarged portion having a first concave connecting surface facing away from said base portion disposed within a first imaginary spherical segmental surface having (1) a center coincident with the center of said first imaginary spherical surface and (2) a radius smaller than the radius of first imaginary spherical surface, the other of said connecting structures comprising a projecting annular wall having a second concave connecting surface disposed within a second imaginary spherical surface having (1) a radius generally equal to the radius of said first imaginary spherical surface and (2) a second pair of parallel truncations, and a projecting central portion within said annular wall having a second convex connecting surface facing in the direction of projection of said annular wall disposed within a second imaginary spherical segmental surface having (1) a center coincident with the center of said second imaginary spherical surface and (2) a radius equal to the radius of said first imaginary spherical segmental surface, the construction of said annular wall being such that said annular wall is operable in response to the movement of said enlarged portion therein to resiliently yield and resiliently return to bring (1) the first convex connecting surface of said enlarged portion into engagement with the second concave connecting surface of said annular wall so as to retain said first and second integral connecting structures against movement in a direction away from one another and (2) said first concave connecting surface of said enlarged portion into engagement with the second convex connecting surface of said projecting central portion so as to limit the movement of said first and second integral connecting structures in a direction toward one another, the engagement of said connecting surfaces permitting relative sliding movement therebetween so as to retain the members in cooperating relation in a multiplicity of different positions of pivotal movement of said mirror unit with respect to said support along said two intersecting perpendicular axes.

5. A rearview mirror as defined in claim 3 wherein the connections between said arms and said mirror unit include structure enabling each connection to be established by a snap action.

6. A rearview mirror as defined in claim 5 wherein the snap action structure of the connection between said first arm and said mirror unit includes a first cylindrical connecting element on said first arm having an axis aligned with said second axis, said mirror unit having first surfaces receiving an outer peripheral portion of said first cylindrical connecting element and a pair of flexible cantilevered arcuate walls for engaging on opposite sides of an inner peripheral portion of said first cylindrical connecting element.

7. A rearview mirror as defined in claim 6 wherein the snap action structure of the connection between said second arm and said mirror unit includes a second cylindrical connecting element on said second arm having an axis aligned with said first axis, said mirror unit having second surfaces slidably receiving an outer peripheral portion of said second cylindrical connecting element for limited lateral movement and a pair of flexible cantilevered L-shaped walls for engaging opposite ends of an inner peripheral portion of said second cylindrical connecting element.

8. A mirror assembly as defined in claim 2 wherein said first arm includes a first pair of arcuate flanges extending from opposite sides thereof, said first pair of flanges being arcuate about said first axis, said second arm including a second pair of arcuate flanges extending from opposite sides thereof, said second pair of flanges being arcuate about said second axis, said first housing part having first and second arcuately spaced pairs of first parallel rail sections fixed therein within said interior space, said first and second arcuately spaced pairs of first parallel rail sections having first and second radially spaced arcuate concave surfaces slidably engaging convex surfaces of said first and second pairs of arcuate flanges respectively, said second housing part having first and second arcuately spaced pairs of second parallel rail sections fixed therein within said interior housing space, said first and second arcuately spaced pairs of second parallel rail sections having first and second radially spaced arcuate convex surfaces slidably engaging concave surfaces of said first and second arcuate flanges respectively.

9. A rearview mirror assembly as defined in claim 1 wherein said manually controlled mechanism comprises a first electric motor carried by said support, a first yieldable motion transmitting assembly operatively connected between said first electric motor and said first arm for effecting pivotal movement of said first arm between said limits and hence of said mirror unit about said central connection and said connection with said second arm, a second electrical motor carried by said support, and a second yieldable motion transmitting assembly operatively connected between said second electrical motor and said second arm for effecting pivotal movement of said second arm between said limits and hence of said mirror unit about said central connection and said connection with said first arm.

10. A rearview mirror assembly as defined in claim 9 wherein said first arm has a first series of gear teeth formed thereon arcuate about said first axis constituting a part of the said first yieldable motion transmitting assembly, said second arm having a second series of gear teeth formed thereon arcuate about said second axis constituting a part of said second yieldable motion transmitting assembly.

11. A rearview mirror assembly as defined in claim 10 wherein said first and second yieldable motion transmitting assemblies include first and second clutch containing motion transmitting gear trains drivingly connected with said first and second electric motors respectively and with said first and second arcuate series of gear teeth on the first and second arms respectively.

12. A rearview mirror assembly as defined in claim 11 wherein each of said first and second clutch containing motion transmitting gear trains includes a worm drivingly connected with the associated electric motor, a worm pinion rotatably mounted between said housing parts and drivingly connected with said worm, a spiral gear fixed to rotate with said worm pinion, a toothed wheel disposed in meshing relation with said spiral gear and rotatably mounted in said support, a pinion wheel rotatably mounted in said support concentrically with and alongside said toothed wheel disposed in meshing relation with the arcuate series of teeth on the associated arm and a spring operatively associated with said wheels for resiliently biasing said wheels toward one another so as to yieldingly interengage clutch surfaces on said wheels.

13. A rearview mirror assembly as defined in claim 9 including a first potentiometer carried in part by said first arm and in part by said support for generating an electrical signal indicative of the position of pivotal movement between said limits of said first arm with respect to said support, a second potentiometer carried in part by said second arm and in part by said support for generating an electrical signal indicative of the position of pivotal movement between said limits of said second arm with respect to said support, a microprocessor electrically connected to said first and second potentiometers and to said first and second electric motors, said microprocessor being capable, upon manually applied storage command, of storing the electrical signals generated by said first and second potentiometers for at least one selected position of said mirror unit, and of causing said mirror unit to be selectively returned to said one selected position at which said storage command was applied by starting said first and second motors and causing the same to continue to run and move mirror unit until the signals generated by said first and second potentiometers are equal to said storage signals, whereupon said microprocessor then stops said first and second motors.

14. A rearview mirror assembly comprising a mirror unit having a mirror side and an opposite side, a mirror unit support disposed on the opposite side of said mirror unit, a first member mounted on said support for pivotal movement between limits with respect to said support about a first axis, said first member including a first pair of spaced arms extending from said support toward said mirror unit and forming first spaced connections with the opposite side of said mirror unit at positions spaced in opposite directions from said first axis, said first member being constructed and arranged to enable limited pivotal movement of said mirror unit with respect to said first member about a second axis disposed in generally intersecting perpendicular relation with said first axis, a second member mounted on said support for pivotal movement between limits with respect to said support about said second axis, said second member including a second pair of spaced arms extending from said support toward said mirror unit and forming second spaced connections with the opposite side of said mirror unit at positions spaced in opposite directions from said second axis, said second member being constructed and arranged to enable limited pivotal movement of said mirror unit with respect to said second member about said first axis, and a manually controlled mirror unit moving mechanism carried in part by said support for effecting a desired movement of said mirror unit together with a corresponding movement of either one or both of said first and second members with respect to said support in response to a remote manual movement by a user.

15. A rearview mirror assembly as defined in claim 14 wherein said manually controlled mechanism comprises a first electric motor carried by said support and a first yieldable motion transmitting assembly operatively connected between said first electric motor and said first member for effecting pivotal movement of said first member between said limits and hence of said mirror unit about said second spaced connections with said second pair of arms, a second electric motor carried by said support and a second yieldable motion transmitting assembly operatively connected between said second electric motor and said second member for effecting pivotal movement of said second member between said limits and hence of said mirror unit about said first spaced connections with said first pair of arms.

16. A rearview mirror assembly as defined in claim 15 wherein one arm of said first pair of arms has a first series of gear teeth formed thereon arcuate about said first axis constituting a part of the associated first yieldable motion transmitting assembly, one arm of said second pair of arms having a series of gear teeth formed thereon arcuate about said second axis constituting a part of said second yieldable motion transmitting assembly.

17. A rearview mirror assembly as defined in claim 16 wherein said first and second yieldable motion transmitting assemblies include first and second clutch containing motion transmitting gear trains drivingly connected with said first and second electric motors respectively and with said first and second arcuate series of gear teeth on the one arm of first and second pairs of arms respectively.

18. A rearview mirror assembly as defined in claim 17 wherein each of said first and second yieldable gear trains includes a worm drivingly connected with the associated electric motor, a worm pinion rotatably mounted between said housing parts and drivingly connected with said worm, a spiral gear fixed to rotate with said worm pinion, a toothed wheel disposed in meshing relation with said spiral gear and rotatably mounted in said support, a pinion wheel rotatably mounted in said support concentrically with and alongside said toothed wheel disposed in meshing relation with the arcuate series of teeth on the associated arm and a spring operatively associated with said wheels for resiliently biasing said wheels toward one another so as to yieldingly interengage clutch surfaces on said wheels.

19. A rearview mirror assembly as defined in claim 15 including a first potentiometer carried in part by one arm of said first pair of arms and in part by said support for generating an electrical signal indicative of the position of pivotal movement between said limits of said first member with respect to said support, a second potentiometer carried in part by one arm of said second pair of arms and in part by said support for generating an electrical signal indicative of the position of pivotal movement between said limits of said second member with respect to said support, a microprocessor electrically connected to said first and second potentiometers and to said first and second electric motors, said microprocessor being capable, upon manually applied storage command, of storing the electrical signals generated by said first and second potentiometers for at least one selected position of said mirror unit, and of causing said mirror unit to be selectively returned to said one selected position at which said storage command was applied by starting said first and second motors and causing the same to continue to run and move mirror unit until the signals generated by said first and second potentiometers are equal to said storage signals, whereupon said microprocessor then stops said first and second motors.

20. A rearview mirror as defined in claim 14 wherein the connections between said arms and said mirror unit include structure enabling each connection to be established by a snap action.

21. A rearview mirror as defined in claim 20 wherein the snap action structure of the connection between said first pair of arms and said mirror unit includes a first cylindrical connecting element on each arm of said first pair of arms having an axis aligned with said second axis, said mirror unit having first surfaces receiving an outer peripheral portion of each first cylindrical connecting element and a pair of flexible cantilevered arcuate walls for engaging on opposite sides of an inner peripheral portion of each first cylindrical connecting element.

22. A rearview mirror as defined in claim 21 wherein the snap action structure of the connection between said second pair of arms and said mirror unit includes a second cylindrical connecting element on each arm of said second pair of arms having an axis aligned with said first axis, said mirror unit having second surfaces receiving an outer peripheral portion of each second cylindrical connecting element and a pair of flexible cantilevered arcuate walls for engaging on opposite sides of an inner peripheral portion of each second cylindrical connecting element.

23. A rearview as defined in claim 14 wherein said support includes first and second separate housing parts disposed in fixed cooperating relation with one another so that said second housing part faces the opposite side of said mirror unit and defines with said first housing part an interior housing space.

24. A mirror assembly as defined in claim 23 wherein said first member includes a first central portion between said first pair of arms having a first pair of arcuate flanges extending from opposite sides thereof, said first pair of flanges being arcuate about said first axis, said second member including a second central portion between said second pair of arms having a second pair of arcuate flanges extending from opposite sides thereof, said second pair of flanges being arcuate about said second axis, said first housing part having first and second arcuately spaced pairs of first parallel rail sections fixed therein within said interior space, said first and second arcuately spaced pairs of first parallel rail sections having first and second radially spaced arcuate concave surfaces slidably engaging convex surfaces of said first and second pairs of arcuate flanges respectively, said second housing part having first and second arcuately spaced pairs of second parallel rail sections fixed therein within said interior housing space, said first and second arcuately spaced pairs of second parallel rail sections having first and second radially spaced arcuate convex surfaces slidably engaging concave surfaces of said first and second arcuate flanges respectively.

25. A rearview mirror assembly comprising
a mirror unit having a mirror side and an opposite side,
a mirror unit support disposed in facing relation to the opposite side of said mirror unit,
a central connection between the opposite side of said mirror unit and said support mounting said mirror unit on said support for pivotal movement about first and second generally intersecting perpendicular axes,
a first member mounted on said support for pivotal movement between limits with respect to said support about said first axis,
said first member including a first pair of spaced arms extending from said support toward said mirror unit and connected with the opposite side of said mirror unit at positions spaced in opposite directions from said first axis for limited pivotal movement with respect to said mirror unit about said second axis,
a second member mounted on said support for pivotal movement between limits with respect to said support about said second axis,
said second member including a second pair of arms extending from said support toward said mirror unit and connected with the opposite side of said mirror unit for compound movement with respect thereto at positions spaced in opposite directions from said second axis which compound movement includes limited lateral movement with respect to said first axis and pivotal movement about an axis which is either coincident with or slightly angularly related with said first axis depending upon the position of relative lateral movement, and
a manually controlled mechanism carried in part by said support for effecting a desired movement of said mirror unit together with a corresponding movement of either one or both of said first and second members in response to a remote manual movement by a user.

26. A rearview mirror as defined in claim 25 wherein said support includes first and second separate housing parts disposed in fixed cooperating relation with one another, so that said second housing part faces the opposite side of said mirror unit and defines with said first housing part an interior housing space.

27. A rearview mirror as defined in claim 26 wherein said mirror unit includes a mirror and a mirror holder within which said mirror is mounted, said mirror holder defining the opposite side of said mirror unit, said central connection including a first connecting structure fixed to the exterior of said mirror holder and extending toward said second housing part and a second connecting structure fixed to the exterior of said second housing part and extending toward said mirror holder, said connecting structures being operable to be moved into cooperating relation with one another by a snap action.

28. A rearview mirror as defined in claim 26 wherein the connections between said arms and said mirror unit include structure enabling each connection to be established by a snap action.

29. A rearview mirror as defined in claim 28 wherein the snap action structure of the connection between said first pair of arms and said mirror unit includes a first cylindrical connecting element on each arm of said first pair of arms having an axis aligned with said second axis, said mirror unit having first surfaces receiving an outer peripheral portion of each first cylindrical connecting element and a pair of flexible cantilevered arcuate walls for engaging on opposite sides of an inner peripheral portion of each first cylindrical connecting element.

30. A rearview mirror as defined in claim 29 wherein the snap action structure of the connection between said second pair of arms and said mirror unit includes a second cylindrical connecting element on each arm of said second pair of arms having an axis aligned with said first axis, said mirror unit having second surfaces slidably receiving an outer peripheral portion of each second cylindrical connecting element for limited lateral movement and a pair of flexible cantilevered L-shaped walls for engaging opposite ends of an inner peripheral portion of each second cylindrical connecting element.

31. A mirror assembly as defined in claim 26 wherein said first member includes a first central portion between said first pair of arms having a first pair of arcuate flanges extending from opposite sides thereof, said first pair of flanges being arcuate about said first axis, said second member including a second central portion between said second pair of arms having a second pair of arcuate flanges extending from opposite sides thereof, said second pair of flanges being arcuate about said second axis, said first housing part having first and second arcuately spaced pairs of first parallel rail sections fixed therein within said interior space, said first and second arcuately spaced pairs of first parallel rail sections having first and second radially spaced arcuate concave surfaces slidably engaging convex surfaces of said first and second pairs of arcuate flanges respectively, said second housing part having first and second arcuately spaced pairs of second parallel rail sections fixed therein within said interior housing space, said first and second arcuately spaced pairs of second parallel rail sections having first and second radially spaced arcuate convex surfaces slidably engaging concave surfaces of said first and second arcuate flanges respectively.

32. A rearview mirror assembly as defined in claim 25 wherein said manually controlled mechanism comprises a first electric motor carried by said support and a first yieldable motion transmitting assembly operatively connected between said first electric motor and said first member for effecting pivotal movement of said first member between said limits and hence of said mirror unit about said central connection and said connections with said second pair of arms, a second electric motor carried by said support and a second yieldable motion transmitting assembly operatively connected between said second electric motor and said second member for effecting pivotal movement of said second member between said limits and hence of said mirror unit about said central connection and said connections with said first pair of arms.

33. A rearview mirror assembly as defined in claim 32 wherein one arm of said first pair of arms has a first series of gear teeth formed thereon arcuate about said first axis constituting a part of the associated first yieldable motion transmitting assembly, one arm of said second pair of arms having a series of gear teeth formed thereon arcuate about said second axis constituting a part of said second yieldable motion transmitting assembly.

34. A rearview mirror assembly as defined in claim 33 wherein said first and second yieldable motion transmitting assemblies include first and second clutch containing motion transmitting gear trains drivingly connected with said first and second electric motors respectively and with said first and second arcuate series of gear teeth on the one arm of first and second pairs of arms respectively.

35. A rearview mirror assembly as defined in claim 34 wherein each of said first and second clutch containing motion transmitting gear trains includes a worm drivingly connected with the associated electric motor, a worm pinion rotatably mounted between said housing parts and drivingly connected with said worm, a spiral gear fixed to rotate with said worm pinion, a toothed wheel disposed in meshing relation with said spiral gear and rotatably mounted in said support, a pinion wheel rotatably mounted in said support concentrically with and alongside said toothed wheel disposed in meshing relation with the arcuate series of teeth on the associated arm and a spring operatively associated with said wheels for resiliently biasing said wheels toward one another so as to yieldingly interengage clutch surfaces on said wheels.

36. A rearview mirror assembly as defined in claim 32 including a first potentiometer carried in part by one arm of said first pair of arms and in part by said support for generating an electrical signal indicative of the position of pivotal movement between said limits of said first member with respect to said support, a second potentiometer carried in part by one arm of said second pair of arms and in part by said support for generating an electrical signal indicative of the position of pivotal movement between said limits of said second member with respect to said support, a microprocessor electrically connected to said first and second potentiometers and to said first and second electric motors, said microprocessor being capable, upon manually applied storage command, of storing the electrical signals generated by said first and second potentiometers for at least one selected position of said mirror unit, and of causing said mirror unit to be selectively returned to said one selected position at which said storage command was applied by starting said first and second motors and causing the same to continue to run and move mirror unit until the signals generated by said first and second potentiometers are equal to said storage signals, whereupon said microprocessor then stops said first and second motors.

* * * * *